(12) United States Patent
Baba et al.

(10) Patent No.: US 11,407,054 B2
(45) Date of Patent: Aug. 9, 2022

(54) ARC WELDING METHOD AND ARC WELDING DEVICE

(71) Applicant: DAIHEN Corporation, Osaka (JP)

(72) Inventors: Hayato Baba, Osaka (JP); Tetsuo Era, Osaka (JP)

(73) Assignee: DAIHEN Corporation, Osaka (JP)

( * ) Notice: Subject to any disclaimer, the term of this patent is extended or adjusted under 35 U.S.C. 154(b) by 493 days.

(21) Appl. No.: 16/463,120

(22) PCT Filed: Dec. 4, 2017

(86) PCT No.: PCT/JP2017/043442
§ 371 (c)(1),
(2) Date: May 22, 2019

(87) PCT Pub. No.: WO2018/105548
PCT Pub. Date: Jun. 14, 2018

(65) Prior Publication Data
US 2019/0283165 A1 Sep. 19, 2019

(30) Foreign Application Priority Data
Dec. 6, 2016 (JP) .............................. JP2016-236944

(51) Int. Cl.
*B23K 9/09* (2006.01)
*B23K 9/095* (2006.01)
(Continued)

(52) U.S. Cl.
CPC ................ *B23K 9/093* (2013.01); *B23K 9/09* (2013.01); *B23K 9/095* (2013.01); *B23K 9/0953* (2013.01);
(Continued)

(58) Field of Classification Search
CPC .... B23K 9/0673; B23K 9/0738; B23K 9/067; B23K 9/092; B23K 9/09; B23K 9/093;
(Continued)

(56) References Cited

U.S. PATENT DOCUMENTS 6,025,573 A * 2/2000 Stava ..................... B23K 9/092
219/130.01
2001/0025832 A1 10/2001 Nakamura et al.
(Continued)

FOREIGN PATENT DOCUMENTS

CN 100509238 C 7/2009
JP 2000-263228 A 9/2000
(Continued)

OTHER PUBLICATIONS

Extended European Search Report for European Application No. 17878292.6 dated Jul. 31, 2020, 8 pages.
(Continued)

*Primary Examiner* — John J Norton
(74) *Attorney, Agent, or Firm* — Rudy J. Ng; Bret E. Field; Bozicevic, Field & Francis LLP (57) ABSTRACT

An arc welding method of a consumable electrode type generating arc between a tip end of welding wire and a to-be-welded portion by feeding welding wire to the to-be-welded portion of a base material while supplying welding current having average current of 300 A or larger to the welding wire, to weld the base material, includes: feeding the welding wire at a speed of the tip end being inserted into a space surrounded by a concave melted portion formed in the base material by the arc generated between the tip end and the to-be-welded portion; periodically alternating between a small current period where the welding current has a small average value and droplet is transferred from the tip end to a bottom part of the melted portion and a large
(Continued)

current period where the welding current has a large average value and droplet is transferred from the tip end to a side part of the melted portion; and controlling the welding current in the large current period so that droplet transfer from the tip end to the side part is performed a plurality of times in each large current period.

6 Claims, 10 Drawing Sheets

(51) Int. Cl.
  *B23K 9/12*   (2006.01)
  *B23K 9/173*  (2006.01)
(52) U.S. Cl.
  CPC ............ *B23K 9/0956* (2013.01); *B23K 9/125* (2013.01); *B23K 9/173* (2013.01)
(58) Field of Classification Search
  CPC .......... B23K 9/095; B23K 9/24; B23K 9/205; B23K 9/173; B23K 9/186
  See application file for complete search history.

(56) References Cited

U.S. PATENT DOCUMENTS

| | | | | |
|---|---|---|---|---|
| 2007/0102405 A1* | 5/2007 | Prinz | ...................... | B23K 9/093 219/130.4 |
| 2007/0102409 A1* | 5/2007 | Koshiishi | ............... | B23K 9/092 219/130.51 |
| 2015/0076119 A1* | 3/2015 | Hsu | ...................... | B23K 9/0216 219/74 |
| 2017/0225253 A1* | 8/2017 | Matsuoka | ................ | B23K 9/09 |
| 2018/0236584 A1* | 8/2018 | Baba | .................... | B23K 33/004 |
| 2019/0176257 A1* | 6/2019 | Furuyama | .............. | B23K 9/124 |

FOREIGN PATENT DOCUMENTS

| | | |
|---|---|---|
| JP | 2001-246471 A | 9/2001 |
| JP | 2007-229775 A | 9/2007 |
| JP | 2017-144480 A | 8/2017 |
| WO | WO2015038711 A1 | 3/2015 |

OTHER PUBLICATIONS

"Study on Arc Behavior and Droplet Transfer Characteristics of Pulse Rotary Jet Transition," Huang Wei, Wanfang Data Knowledge Service Platform, 1995, 65 pages (English abstract on p. 3).

Office Action dated Dec. 3, 2020, issued in the Chinese Patent Application No. 201780073640.7, 9 pages.

English Translation of the Summary of the Office Action dated Dec. 3, 2020, issued in the Chinese Patent Application No. 201780073640.7, 3 pages.

Machine translation of the Office Action dated Dec. 3, 2020, issued in the Chinese Patent Application No. 201780073640.7, 6 pages.

English Translation of International Search Report for PCT/JP2017/043442 dated Jan. 16, 2018, 2 pages.

* cited by examiner

ARC WELDING METHOD AND ARC WELDING DEVICE

CROSS-REFERENCE TO RELATED APPLICATIONS

This application is the national phase under 35 U. S. C. § 371 of PCT International Application No. PCT/JP2017/043442 which has an International filing date of Dec. 4, 2017 and designated the United States of America.

FIELD

The present disclosure relates to an arc welding method and an arc welding device of a consumable electrode type.

BACKGROUND

One example of a welding method is a gas shielded arc welding method of a consumable electrode type (Japanese Patent Application Laid-Open Publication No. 2007-229775, for example). The gas shielded arc welding method is a method of generating arc between a base material and a welding wire fed to a to-be-welded portion of the base material, to weld the base material by heat of arc, in which inert gas is injected around the to-be-welded portion to perform welding so as to particularly prevent oxidation of the base material heated to a high temperature. A thin plate having the thickness of approximately 5 mm may be welded at the butt joint of the base material by a single pass.

For a thick plate having the thickness of 9 to 30 mm, however, the base material cannot be welded by a single pass in the conventional gas shielded arc welding method.

Thus, multi-layer welding in which welding operations are repeated multiple times is employed to weld a thick plate. The multi-layer welding, however, causes a problem of increase in the number of welding steps.

This also raises other issues such as increased heat input, deformation of base material and embrittlement of a welded portion.

SUMMARY

The present inventors have conducted extensive study to solve such problems and found that single pass welding for a thick plate may be achieved by feeding a welding wire at a higher speed and by supplying larger current compared to a general gas shielded arc welding method. More specifically, single pass welding for a thick plate may be achieved by feeding the welding wire at approximately 5 to 100 meters per minute and supplying large current of 300 A or more. High-speed feeding of welding wire and supply of large current form a concave melted portion at the base material due to the heat of arc, and the tip end of the welding wire goes into a space surrounded by the melted portion. By the tip end of the welding wire passing the surface of the base material and going deeper, the melted portion penetrates through the base material to the back surface thereof in the thickness direction, which allows for single pass welding. In the description below, the space surrounded by the concave melted portion will be referred to as a buried space, while arc generated between the base material or the melted portion and the tip end of the welding wire inserted into the buried space will appropriately be referred to as buried arc.

The present inventors have further found that, in buried arc welding, a buried space may stably be maintained by periodically varying welding current. Normally, the base material melted by the heat of arc and the molten metal of the welding wire flow in a direction of closing the buried space to bury the tip end of the welding wire. If the tip end of welding wire is made in contact with the closed welded portion and short-circuited, welding is significantly made unstable. When, however, welding current is periodically varied, the position of the tip end of welding wire inserted into the buried space moves up and down in one cycle of current variation. In the state where the position of the wire tip end is high, arc is directed to a side part of the melted portion and the force of arc restrains the welded portion from being closed. Thus, by periodically varying the welding current, the buried state may be stabilized and maintained.

In the method described above, however, state transition from a state where the position of the wire tip end is low to a state where it is high in the buried space is achieved in one droplet transfer, which makes it necessary for the welding wire 5 to melt rapidly in a short period of time, resulting in formation of a long liquid column at the tip end of welding wire. This long liquid column greatly moves around when affected by a force such as an arc force, and further takes significantly unstable behavior in some cases, such as short-circuiting with the side part of the melted portion. The unstabilized liquid column is partly or entirely blown off to the outside of the buried space, which then becomes large sputter particles.

The present disclosure has been made in view of the circumstances described above, and aims to provide an arc welding method and an arc welding device capable of, in buried arc welding performed using large current of 300 A or larger, suppressing the occurrence of sputter while stably maintaining the buried space, allowing for stable welding.

An arc welding method according to an aspect of the present disclosure is an arc welding method of a consumable electrode type for welding the base material, in which welding current having average current of 300 A or larger is supplied to the welding wire while feeding the welding wire to a to-be-welded portion of a base material to generate arc between a tip end of the welding wire and the to-be-welded portion. The welding wire is supplied at a speed of the tip end being inserted into a space surrounded by a concave melted portion formed in the base material by the arc generated between the tip end and the to-be-welded portion. A small current period with a small average value of the welding current during which droplet transfer occurs from the tip end to the bottom of the melted portion and a large current period with a large average value of the welding current during which droplet transfer occurs from the tip end to the side part of the melted portion are periodically alternated with each other. Furthermore, the welding current in the large current period is controlled so that the droplet transfer from the tip end to the side part is performed multiple times in each large current period.

According to the aspect of the present disclosure, the tip end of the welding wire goes into the buried space surrounded by a concave melted portion, where buried arc is generated. More specifically, the tip end of the welding wire is surrounded by the melted portion, and the position of the wire tip end in the buried space may be moved up and down by periodically varying welding current, so that arc is generated between the tip end of welding wire and the bottom of the melted portion as well as between the tip end of welding wire and a side of the melted portion.

In the small current period, arc is generated between the tip end of welding wire and the bottom of the melted portion, and deep penetration may be obtained by the arc directed to the bottom of the melted portion.

In the large current period, arc is generated between the tip end of welding wire and a side part of the melted portion. Although the base material melted by the heat of arc and the molten metal of the welding wire tend to flow in a direction in which the tip end of the welding wire is buried, they are pushed back by the force of arc, which is emitted from the tip end of welding wire to the side part of the melted portion and are stabilized in the state where the tip end is surrounded by the melted portion.

Furthermore, in the buried arc welding in which the position of the wire tip end moves up and down, droplet transfer is performed multiple times during the course of transition from the state where the position of the tip end of wire is low to the state where it is high, the length of the liquid column formed by one droplet transfer may be restricted to be short, which can suppress the occurrence of sputter.

As described above, according to the present disclosure, in the buried arc welding, the occurrence of sputter may be suppressed while stably maintaining the buried space.

In the arc welding method according to another aspect of the present disclosure, pulsed large current is supplied multiple times in the large current period.

According to the aspect of the present disclosure, during the course of transition from the state where the position of the tip end of wire is low to the state where it is high, droplet transfer of welding wire is gradually performed every time pulsed large current is supplied. Accordingly, the length of the liquid column formed by droplet transfer in the buried arc welding may be restricted to be short, which can suppress the occurrence of sputter.

In the arc welding method according to another aspect of the present disclosure, the large current period is longer than the small current period, and the welding current in the large current period is constant.

According to the aspect of the present disclosure, a long large current period is provided, and constant welding current is supplied during the large current period. Thus, during the course of transition from the state where the position of the tip end of wire is low to the state where it is high, droplet transfer of welding wire is gradually performed. Accordingly, the length of the liquid column formed by droplet transfer in the buried arc welding may be restricted to be short, which can suppress the occurrence of sputter.

In the arc welding method according to another aspect of the present disclosure, the welding current is increased step by step in the large current period.

According to the aspect of the present disclosure, welding current is increased step by step in the large current period, in the course of transition from the state where the position of the tip end of wire is low to the state where it is high, abrupt welding of welding wire is suppressed and droplet transfer of welding wire is gradually performed. Accordingly, the length of the liquid column formed by droplet transfer in the buried arc welding may be restricted to be short, which can suppress the occurrence of sputter.

In the arc welding method according to another aspect of the present disclosure, the current difference between the welding current in a previous stage of a stage where the maximum welding current is supplied in the large current period and the welding current in the small current period is larger than the current difference between the welding current in the previous stage and the maximum welding current.

According to the aspect of the present disclosure, relatively large welding current is supplied in a stage where the tip end of welding wire is deeply inserted into the buried space, thereby mostly completing droplet transfer. In the state where the position of the tip end of welding wire is low, i.e., the state where the tip end of welding wire is deeply inserted into the buried space, the liquid column of welding wire grows long, which lowers the possibility of sputter particles jumping out from the buried space even in the case of droplet transfer. By supplying maximum welding current at the final stage where the position of the tip end of welding wire is high, i.e. where the insertion of welding wire into the buried space is low, a small amount of droplet is transferred. Accordingly, the length of the liquid column formed by droplet transfer in the buried arc welding may be restricted to be short, which can suppress the occurrence of sputter.

In the arc welding method according to another aspect of the present disclosure, the large current period and the small current period are alternated with each other at a frequency in the range from 10 Hz to 1000 Hz.

In the buried arc welding according to the aspect of the present disclosure, molten metal of welding wire as well as the base material melted by the heat of arc are increased, causing corrugation in molten metal due to arc, and possibly causing significant periodical irregularities in the shape of a bead formed by the molten metal being solidified.

However, by periodically varying the welding current with the frequency described above, the molten metal may be finely vibrated at a frequency higher than the coarse corrugation cycle, which can prevent the molten metal from having coarse corrugation.

An arc welding device according to a aspect of the present disclosure is of a consumable electrode type including a wire feeding part that feeds welding wire to a to-be-welded portion of a base material, and a power supply unit that supplies welding current to the welding wire, and welding the base material by supplying welding current having average current of 300 A or larger to the welding wire to generate arc between a tip end of the welding wire and the to-be-welded portion. The wire feeding part feeds the welding wire at a speed of the tip end being inserted into a space surrounded by a concave melted portion formed in the base material by the arc generated between the tip end and the to-be-welded portion. The power supply unit periodically alternates a small current period where the welding current has a small average value and droplet is transferred from the tip end to the bottom part of the melted portion, and a large current period where the welding current has a large average value and droplet is transferred from the tip end to a side part of the melted portion, and controls the welding current in the large current period so that droplet transfer from the tip end to the side part is performed multiple times in each large current period.

According to the aspect of the present disclosure, as described above for the arc welding method, in the buried arc welding, the occurrence of sputter may be suppressed while stably maintaining a buried space.

According to the present disclosure, in the buried arc welding using large current of 300 A or larger, the occurrence of sputter may be suppressed while stably maintaining the buried space, allowing for stable welding.

The above and further objects and features will more fully be apparent from the following detailed description with accompanying drawings.

DETAILED DESCRIPTION

The present disclosure will be described below in detail with reference to the drawings illustrating the embodiments thereof.

Embodiment 1

Figure 1:
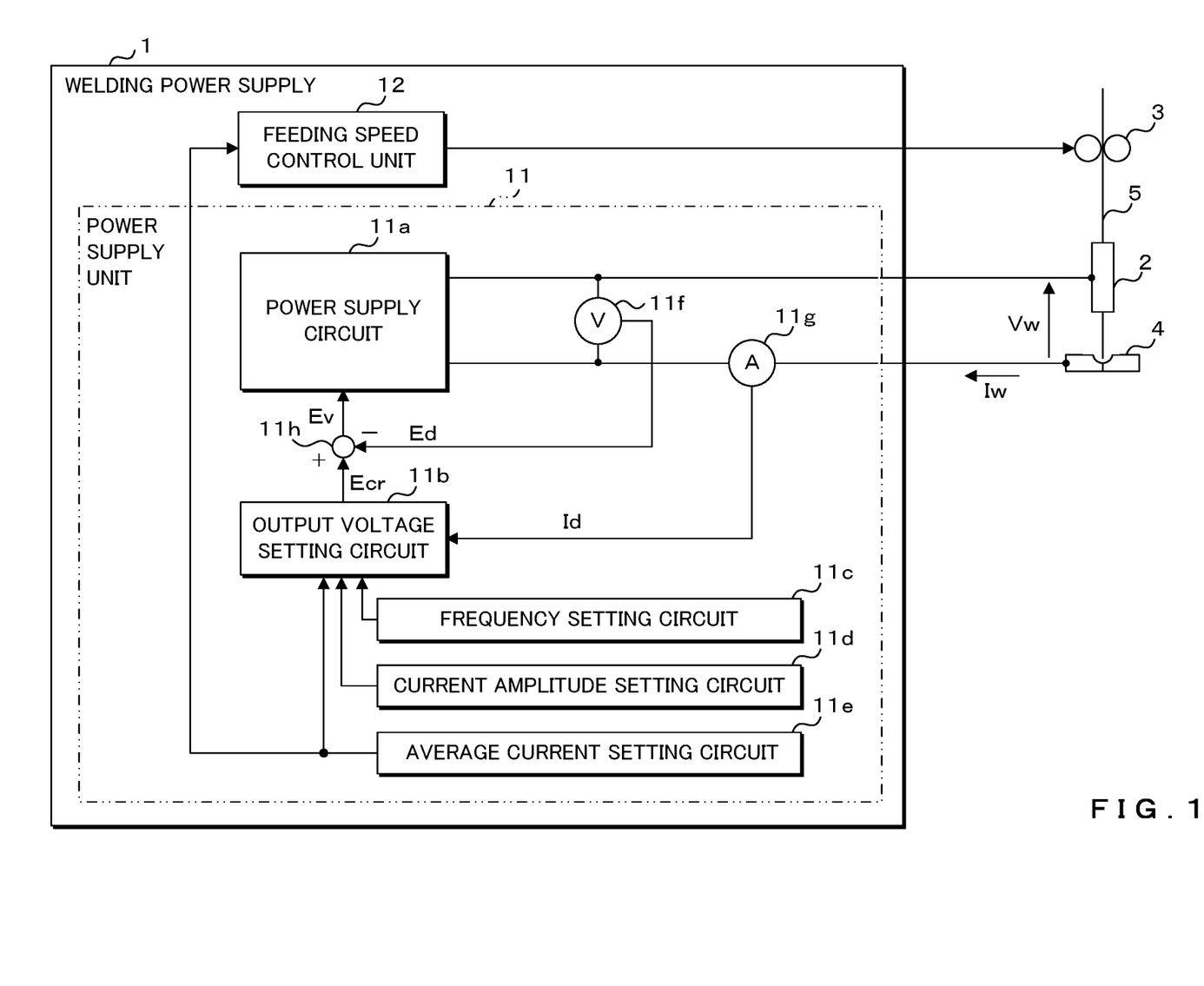
FIG. 1 is a schematic diagram illustrating a configuration example of an arc welding device according to Embodiment 1.

FIG. 1 is a schematic diagram illustrating a configuration example of an arc welding device according to Embodiment 1. The arc welding device according to Embodiment 1 is a gas shield arc welding machine of a consumable electrode type that is capable of butt welding a base material 4 having a plate thickness of 9 mm to 30 mm by a single pass. In particular, the arc welding device according to Embodiment 1 is to control welding current Iw so as to move up and down the position of a tip end 5a of a welding wire 5 inserted into a buried space 6a (see FIG. 4) and to perform droplet transfer multiple times during the course of shifting of the position of the tip end 5a of welding wire 5 from a low state to a high state, thereby making it possible to suppress the occurrence of sputter while stably maintaining the buried space 6a.

The arc welding device according to Embodiment 1 includes a welding power supply 1, a torch 2 and a wire feeding part 3.

Figure 4:
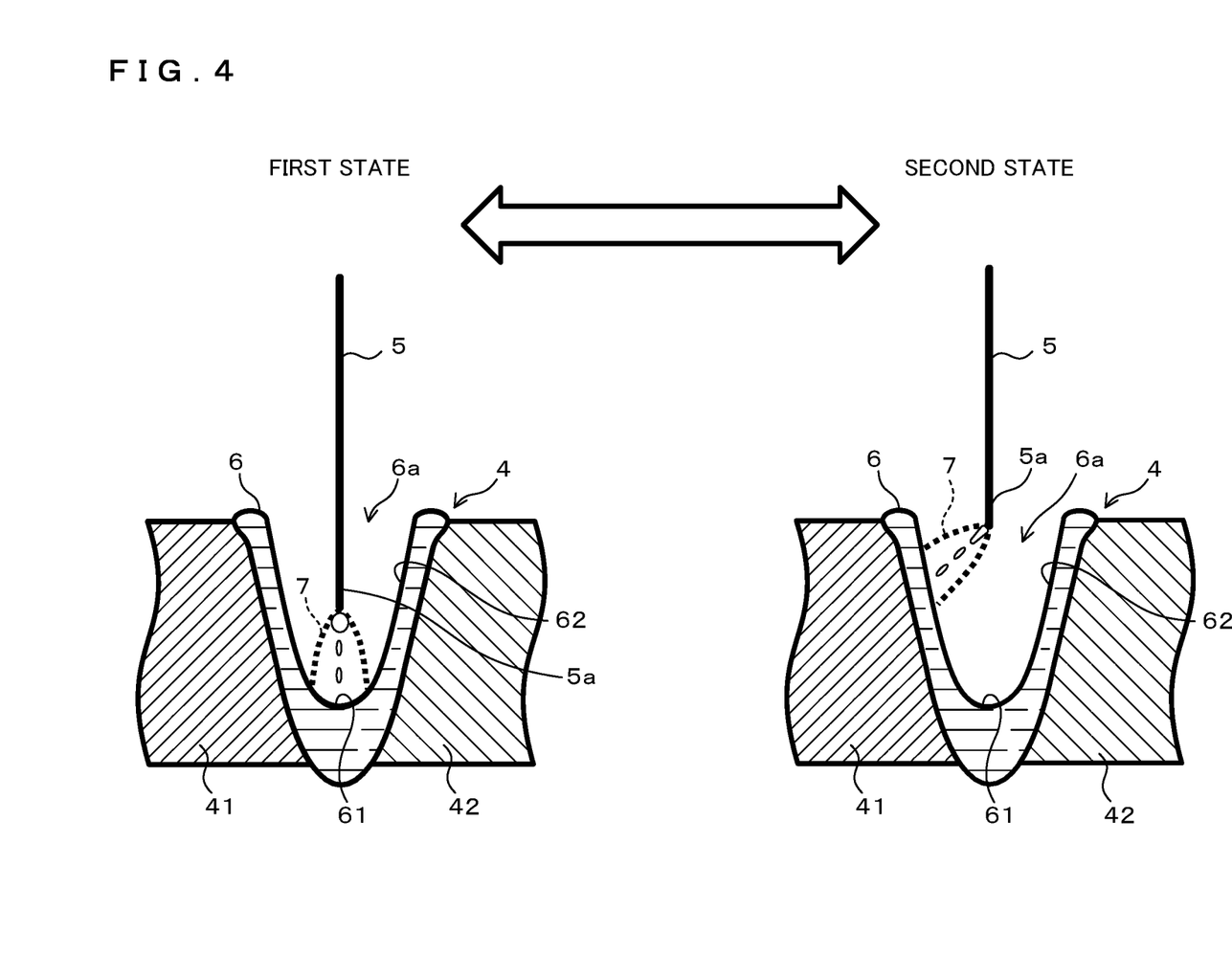
FIG. 4 is a schematic view illustrating how droplet is transferred by periodically varying welding current.

The torch 2 is made of conductive material such as copper alloy, and has a cylindrical contact chip which guides the welding wire 5 to a to-be-welded portion of the base material 4 while supplying welding current Iw required to generate arc 7 (see FIG. 4). The contact chip makes contact with the welding wire 5 penetrating into the contact chip, and supplies welding current Iw to the welding wire 5. Moreover, the torch 2 has a hollow cylindrical shape surrounding the contact chip, and has a nozzle for spraying shield gas to a portion to be welded. The shield gas is to prevent oxidation of the base material 4 melted by the arc 7 as well as the welding wire 5. The shield gas is, for example, carbon dioxide gas, mixed gas containing carbon dioxide gas and argon gas, or inert gas such as argon.

The welding wire 5 is, for example, solid wire having a diameter of 0.9 mm to 1.6 mm, and functions as a consumable electrode. The welding wire 5 is, for example, a pack wire accommodated into a pail pack while being wound in a helical manner, or a reel wire wound around a wire reel.

The wire feeding part 3 includes a feed roller that feeds the welding wire 5 to the torch 2 and a motor that rotates the feed roller. The wire feeding part 3 rotates the feed roller to pull out the welding wire 5 from a wire reel, and feeds the pulled-out welding wire 5 to the torch 2. Such a feeding method for the welding wire 5 is a mere example, and is not particularly limited thereto.

The welding power supply 1 is connected to the contact chip of the torch 2 and the base material 4 via power supply cables, and includes a power supply unit 11 that supplies welding current Iw and a feeding speed control unit 12 that controls the feeding speed of the welding wire 5. It is noted that the power supply unit 11 and the feeding speed control unit 12 may be formed in separate pieces. The power supply unit 11 includes a power supply circuit 11a that outputs PWM-controlled direct current, an output voltage setting circuit 11b, a frequency setting circuit 11c, a current amplitude setting circuit 11d, an average current setting circuit 11e, a voltage detection unit 11f, a current detection unit 11g and a comparison circuit 11h.

The voltage detection unit 11f detects welding voltage Vw, and outputs a voltage value signal Ed indicating the detected voltage value to the comparison circuit 11h.

The current detection unit 11g detects, for example, welding current Iw supplied from the welding power supply 1 to the welding wire 5 via the torch 2 and flowing through the arc 7, and outputs a current value signal Id indicating the detected current value to the output voltage setting circuit 11b.

The frequency setting circuit 11c outputs a frequency setting signal for setting a frequency for periodically varying the welding voltage Vw and welding current Iw between the base material 4 and the welding wire 5 to the output voltage setting circuit 11b. In the case of implementing the arc welding method according to Embodiment 1, the frequency setting circuit 11c outputs a frequency setting signal indicating a frequency in a range from 10 Hz to 1000 Hz, preferably from 50 Hz to 300 Hz, more preferably from 80 Hz to 200 Hz.

The current amplitude setting circuit 11d outputs an amplitude setting signal for setting the amplitude of the welding current Iw which periodically varies, to the output voltage setting circuit 11b. The amplitude is a difference in current between the minimum current value and the maximum current value of varying welding current Iw. In the case of implementing the arc welding method according to Embodiment 1, the current amplitude setting circuit 11d outputs an amplitude setting signal indicating a current amplitude of 50 A or larger, more preferably a current amplitude in the range from 100 A to 500 A, more preferably a current amplitude in the range from 200 A to 400 A.

The average current setting circuit 11e outputs an average current setting signal for setting average current of periodically varying welding current Iw to the output voltage setting circuit 11b and the feeding speed control unit 12. In the case of implementing the arc welding method according to Embodiment 1, the average current setting circuit 11e outputs an average current setting signal indicating average current of 300 A or larger, preferably average current in a range from 300 A to 1000 A, more preferably average current in a range from 500 A to 800 A.

The output voltage setting circuit 11b generates an output voltage setting signal Ecr indicating rectangular wave-like target voltage so that the welding current Iw has a target frequency, a current amplitude and a target average current, based on the current value signal Id, frequency setting signal, amplitude setting signal and average current setting signal output from the respective units, and outputs the generated output voltage setting signal Ecr to the comparison circuit 11h.

The comparison circuit 11h compares the voltage value signal Ed output from the voltage detection unit 11f with the output voltage setting signal Ecr output from the output voltage setting circuit 11b, and outputs a differential signal Ev indicating the difference between the signals to the power supply circuit 11a.

The power supply circuit 11a includes, for example, an AC-DC converter performing AC-DC conversion on commercial alternate current, an inverter circuit converting direct current subjected to AC-DC conversion into required alternate current by switching, and a rectification circuit rectifying the alternate current obtained by conversion. The power supply circuit 11a performs PWM control on the inverter in accordance with the differential signal Ev output from the comparison circuit 11h, and outputs voltage to the welding wire 5. As a result, welding voltage Vw that varies periodically is applied between the base material A and the welding wire 5, and the welding current Iw flows. The welding power supply 1 is configured to receive an output instruction signal input from the outside via a control communication line (not illustrated), and the power supply unit 11 starts supplying the welding current Iw to the power supply circuit 11a using the output instruction signal as a trigger. The output instruction signal is, for example, output from a welding robot to the welding power supply 1. Moreover, in the case of a manual welding machine, the output instruction signal is output to the welding power supply 1 from the torch 2 side when a hand operation switch located on the torch 2 side is operated.

Figure 2:
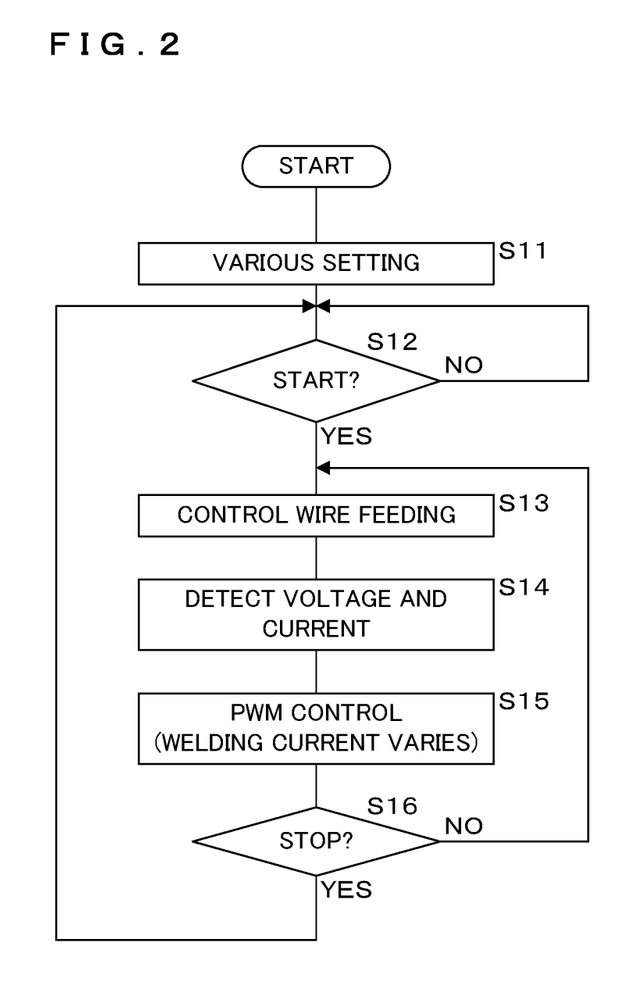
FIG. 2 is a flowchart illustrating a procedure of an arc welding method according to Embodiment 1.
Figure 3:
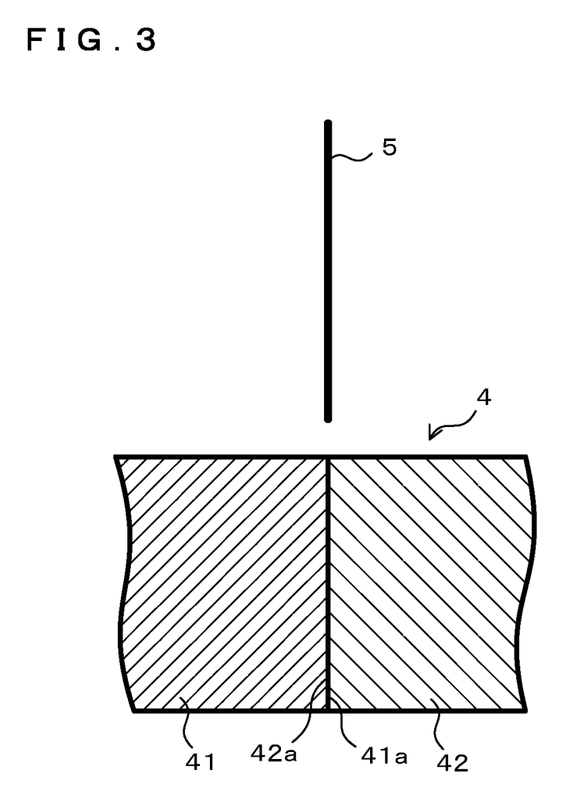
FIG. 3 is a side section view illustrating a base material to be welded.

FIG. 2 is a flowchart illustrating a procedure of an arc welding method according to Embodiment 1. FIG. 3 is a side section view illustrating a base material 4 to be welded. First, a pair of base materials A to be joined by welding are placed at the arc welding device, and various settings for the welding power supply 1 are performed (step S11). More specifically, a planar first base material 41 and a planar second base material 42 are prepared and arranged at predetermined welding work positions while end faces 41a and 42a that are to be welded are butted with each other. The first and second base materials 41 and 42 are steel plates made of, for example, soft steel, carbon steel for machine structural use or alloy steel for machine structural use, having a thickness ranging from 9 mm to 30 mm.

The power supply device 1 then sets the welding condition of welding current Iw within a range at the frequency from 10 Hz to 1000 Hz, the average current of 300 A or larger and the current amplitude of 50 A or higher.

It is noted that the condition for welding current Iw may totally be set by a welding worker, or the welding power supply 1 may accept the implementation of a welding method according to Embodiment 1 to automatically set all conditions. Furthermore, the welding power supply 1 may accept a part of the welding conditions such as average current through the operation unit and determine the rest of the welding conditions conforming to the accepted part of welding conditions so as to semi-automatically set the conditions.

After various settings are performed, the welding power supply 1 determines whether or not the condition for starting output of the welding current Iw is satisfied (step S12). More specifically, the welding power supply 1 determines whether or not an output instruction signal for welding is input. If it is determined that no output instruction signal is input and the output starting condition of welding current Iw is not satisfied (step S12: NO), the welding power supply 1 waits in the state of waiting input of an output instruction signal.

If it is determined that the condition for starting welding current Iw is satisfied (step S12: YES), the feeding speed control unit 12 of the welding power supply 1 outputs to the wire feeding part 3 a feed control signal for instructing to feed wire, so that the welding wire 5 is fed at a predetermined speed (step S13). The feeding speed of the welding wire 5 is set within the range of, for example, approximately 5 to 100 meters per minute. The feeding speed control unit 12 decides the feeding speed in accordance with the average current setting signal output from the average current setting circuit 11e. It is noted that the feeding speed of welding wire 5 may be at a constant speed or may be varied periodically. It may also be configured that a welding worker may directly set the feeding speed of wire.

Subsequently, the power supply unit 11 of the welding power supply 1 detects welding voltage Vw and welding current Iw at the voltage detection unit 11f and the current detection unit 11g (step S14), and performs PWM control so that the frequency, current amplitude and average current for the detected welding current Iw correspond to the set welding conditions and the welding current Iw periodically varies (step S15).

Subsequently, the power supply unit 11 of the welding power supply 1 determines whether or not the output of welding current Iw is stopped (step S16). More specifically, the welding power supply 1 determines whether or not an input of the output instruction signal continues. If it is determined that the input of the output instruction signal continues and the output of welding current Iw is not stopped (step S16: NO), the power supply unit 11 returns the processing to step S13 and continues outputting welding current Iw.

If it is determined that the output of the welding current Iw is stopped (step S16: YES), the power supply unit 11 returns the processing to step S12.

Periodical variation of welding current Iw and droplet transfer will be summarized below.

In the arc welding method according to Embodiment 1, the power supply unit 11 controls the welding current Iw such that the frequency thereof ranges from 10 Hz to 1000 Hz, the average current is 300 A or larger and the current amplitude is 50 A or higher.

Preferably, the power supply unit 11 controls the welding current Iw such that the frequency thereof ranges from 50 Hz to 300 Hz, the average current ranges from 300 A to 1000 A, and the current amplitude ranges from 100 A to 500 A.

FIG. 4 is a schematic view illustrating how droplet is transferred by periodically varying welding current Iw. If the welding current Iw is periodically varied under such welding conditions, a concave melted portion 6 is formed at the base material 4, which is made of the molten metal of the welding wire 5 and the base material 4 melted by the heat of arc 7 generated between the tip end 5a of the welding wire 5 and a to-be-welded portion. The arc 7 is photographed with a high-speed camera, to find that its state is periodically changed between the first state where the arc 7 is generated between the tip end 5a of the welding wire 5 and a bottom part 61 of the melted portion 6, and the second state where the arc 7 is generated between the tip end 5a and a side part 62 of the melted portion 6.

More specifically, the state is repeatedly switched between the first state where the arc 7 is directed from the tip end of the welding wire W to the bottom part 61 of the melted portion 6 and the second state where the arc 7 is directed from the tip end 5a of the welding wire 5 to a side part 62 of the melted portion 6. A small current period with a small average value of welding current Iw corresponds to the first state whereas a large current period with a large average value of welding current Iw corresponds to the second state. The first state is a state where the droplet transfer for the welding wire 5 takes a form of drop transfer. The second state is a state where, for example, the droplet transfer for the welding wire 5 takes a form of rotating transfer or pendulum transfer.

The drop transfer is an example of a form where droplet is transferred from the tip end 5a of welding wire 5 to the bottom part 61 of the melted portion 6, whereas the rotating transfer is an example of a form where droplet is transferred from the tip end 5a of welding wire 5 to the side part 62 of the melted portion 6. Furthermore, the pendulum transfer is a characteristic form of droplet transfer where the liquid column and arc 7 formed at the tip end 5a of welding wire 5 is oscillated in pendulum on the same plane while the plane gradually rotates as a whole with its central axis corresponding to the protruding direction of welding wire 5.

Although the molten metal tends to flow in the direction in which the buried space 6a is closed and the tip end 5a of the welding wire 5 is buried, the arc 7 jumps to the side part 62 of the melted portion 6 in the second state, the molten metal of the melted portion 6 is pushed back in the direction of being separated from the welding wire 5, and thus the buried space 6a is stabilized in a concave state. In the right view in FIG. 4, as a result of droplet transfer at the tip end 5a of the welding wire 5 melted due to large current, the tip end 5a of welding wire 5 is shortened.

The first state and the second state are switched from each other at a frequency ranging from 80 Hz to 200 Hz, which allows micro vibration of molten metal to occur at a frequency higher than the large corrugation frequency, suppressing corrugation formed on the molten metal.

Now, control of welding current Iw and droplet transfer will be described in detail below.

Figure 5:
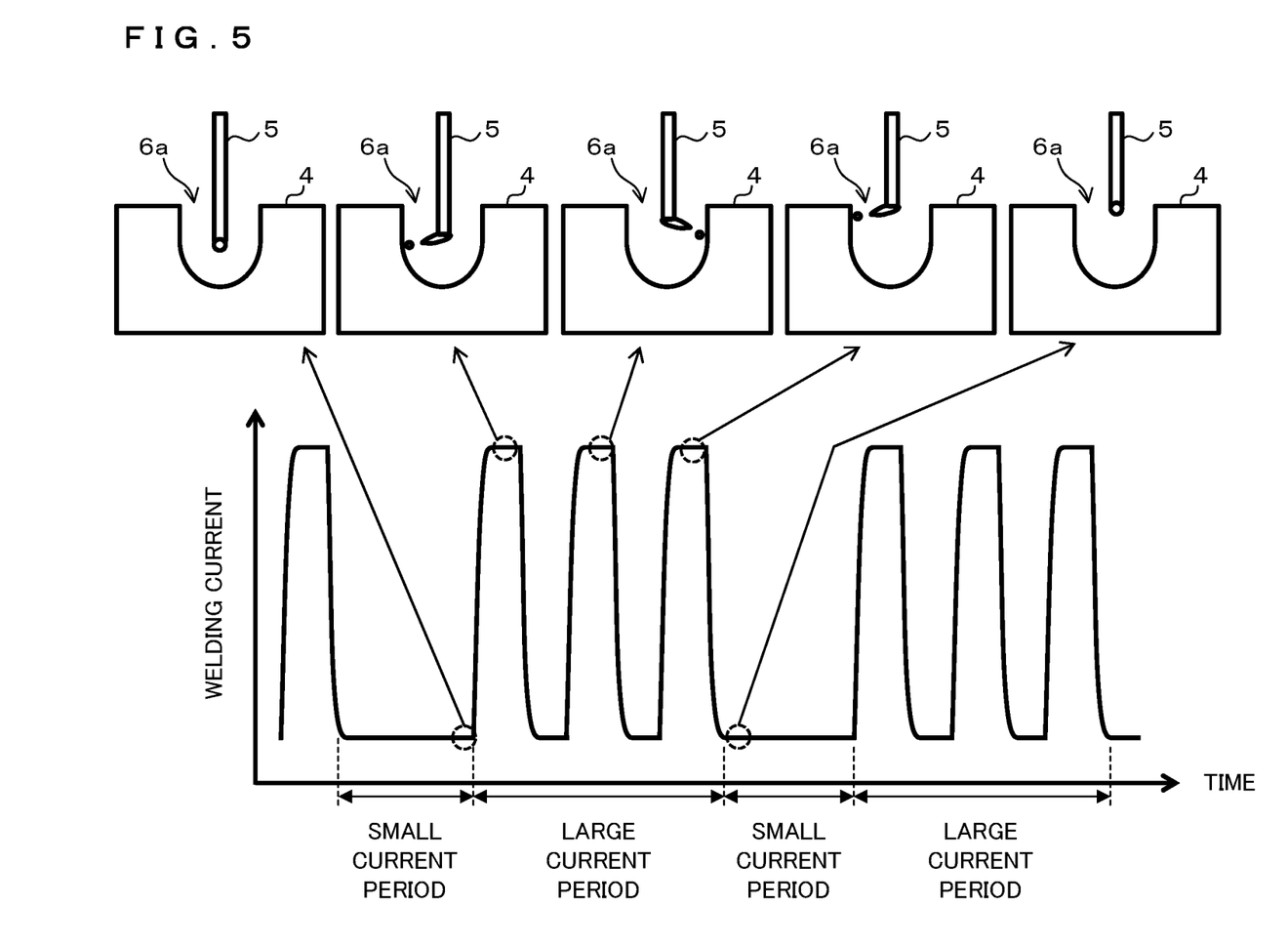
FIG. 5 is a graph illustrating a variation of welding current according to Embodiment 1.

FIG. 5 is a graph illustrating a variation of welding current Iw according to Embodiment 1. The horizontal axis of the graph indicates time, whereas the vertical axis thereof indicates welding current Iw. Moreover, above the graph, a procedure of droplet transfer associated with the change in welding current Iw is schematically illustrated. Each schematic view illustrates the state of welding wire 5 and droplet transfer when the welding current Iw indicated by a dot circle is being supplied. Likewise, the schematic views in FIGS. 6, 7, 8 and 10 described below also illustrate the state of welding wire 5 and droplet transfer.

In Embodiment 1, the power supply unit 11 controls the welding current Iw in the large current period such that droplet transfer from the tip end 5a of welding wire 5 to the side part 62 of the melted portion 6 is performed multiple times. More specifically, the power supply unit 11 controls welding current Iw such that pulsed large current is supplied multiple times during the large current period as illustrated in FIG. 5. For example, the power supply unit 11 supplies pulsed large current three times in the large current period. The magnitude of pulsed current is approximately the same for each time. The welding current Iw in the small current period is 200 A, for example, whereas pulsed large current in the large current period is 800 A, for example.

In the small current period, as illustrated in the leftmost schematic view in FIG. 5, the tip end 5a of welding wire 5 is deeply inserted into the buried space 6a, and the arc 7 is directed to the bottom part 61 of the melted portion 6. When the arc 7 is directed to the bottom part 61 of the melted portion 6, deep penetration may be obtained.

In the large current period, as illustrated in three schematic views in the middle of FIG. 5, droplet transfer is performed little by little from the tip end 5a of welding wire 5 to the side part 62 of the melted portion 6 to shift the state of the wire tip position from a state where the position is low to a state where the position is high. In the case where the tip end 5a of welding wire 5 is at a high position, the arc 7 is directed to the side part 62 of the melted portion 6 and thus the buried space 6a is stabilized. Since droplet transfer is performed little by little, the occurrence of sputter may effectively be suppressed.

When alternated with the small current period again, the state of wire is changed from the state where the position of the wire tip end is high to the state where the position is low, as illustrated in the rightmost and leftmost schematic views in FIG. 5.

Thereafter, the state change is repeatedly performed. By varying the welding current Iw as described above, in the buried arc welding, deep penetration may be obtained while the buried space 6a is stably maintained, and also the occurrence of sputter may be suppressed, allowing for stable one pass penetration welding of a thick plate.

Figure 6:
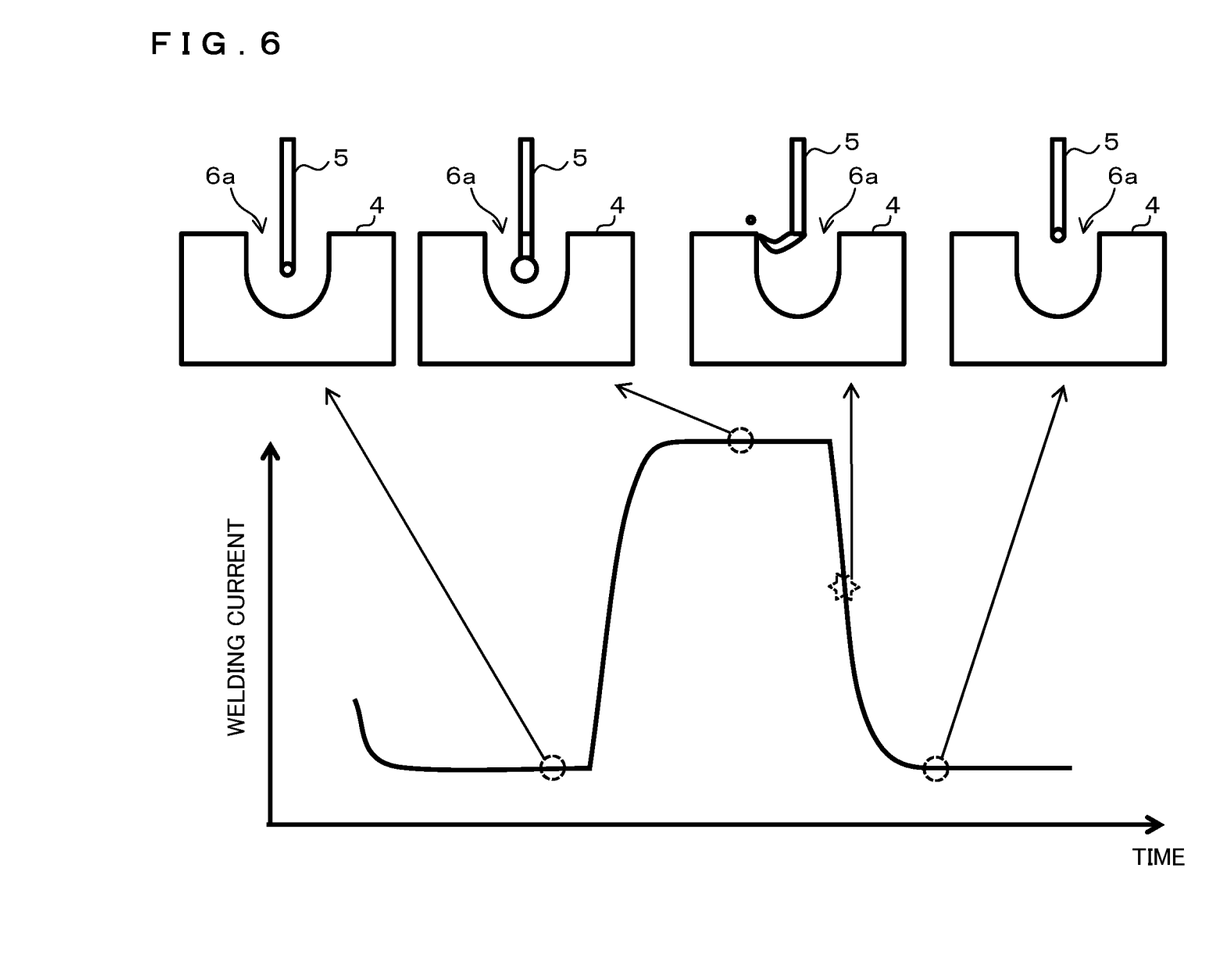
FIG. 6 is a graph illustrating a variation of welding current according to a comparative example.

FIG. 6 is a graph illustrating a variation of welding current Iw according to a comparative example. The horizontal axis of the graph indicates time, whereas the vertical axis thereof indicates welding current Iw. Moreover, above the graph, a procedure of droplet transfer associated with the change in welding current Iw is schematically illustrated.

In the comparison example, the large current period has the same length as the small current period, and required large current is supplied at a time steadily in the large current period. In the state where the tip end 5a of welding wire 5 is inserted into the buried space 6a, if the welding current Iw is rapidly increased and large current is supplied at a time, the welding wire 5 is rapidly melted resulting in formation of a long liquid column and a large droplet is transferred in the vicinity of the opening of the buried space 6a, as illustrated in the two schematic views in the middle of FIG. 6. In the drawing, at the time point indicated by the broken star, short-circuit occurs in the welding wire 5 and the melted portion 6, which thus generates large sputter particles.

As can be seen from the comparison between FIG. 5 and FIG. 6, in the large current period, pulsed large current is supplied multiple times to shift the droplets little by little, which can suppress the occurrence of sputter.

Accordingly, with the arc welding method and arc welding device according to Embodiment 1 configured as described above, in the buried arc welding using large current of 300 A or larger, the occurrence of sputter may be suppressed while stably maintaining the buried space 6a, allowing for stable single pass penetration welding of a thick plate.

Moreover, even if buried arc welding is performed using large current of 300 A or higher, corrugation of molten metal may be suppressed by periodically varying welding current Iw, which can prevent disturbance and drooping of a bead from occurring.

Embodiment 2

As the arc welding method and the arc welding device according to Embodiment 2 are different from those in Embodiment 1 for the method of controlling welding current Iw, the difference will mainly be described below. Since the other configurations and effects are similar to those in Embodiment 1, corresponding parts are denoted by similar reference codes and detailed description thereof will not be repeated.

Figure 7:
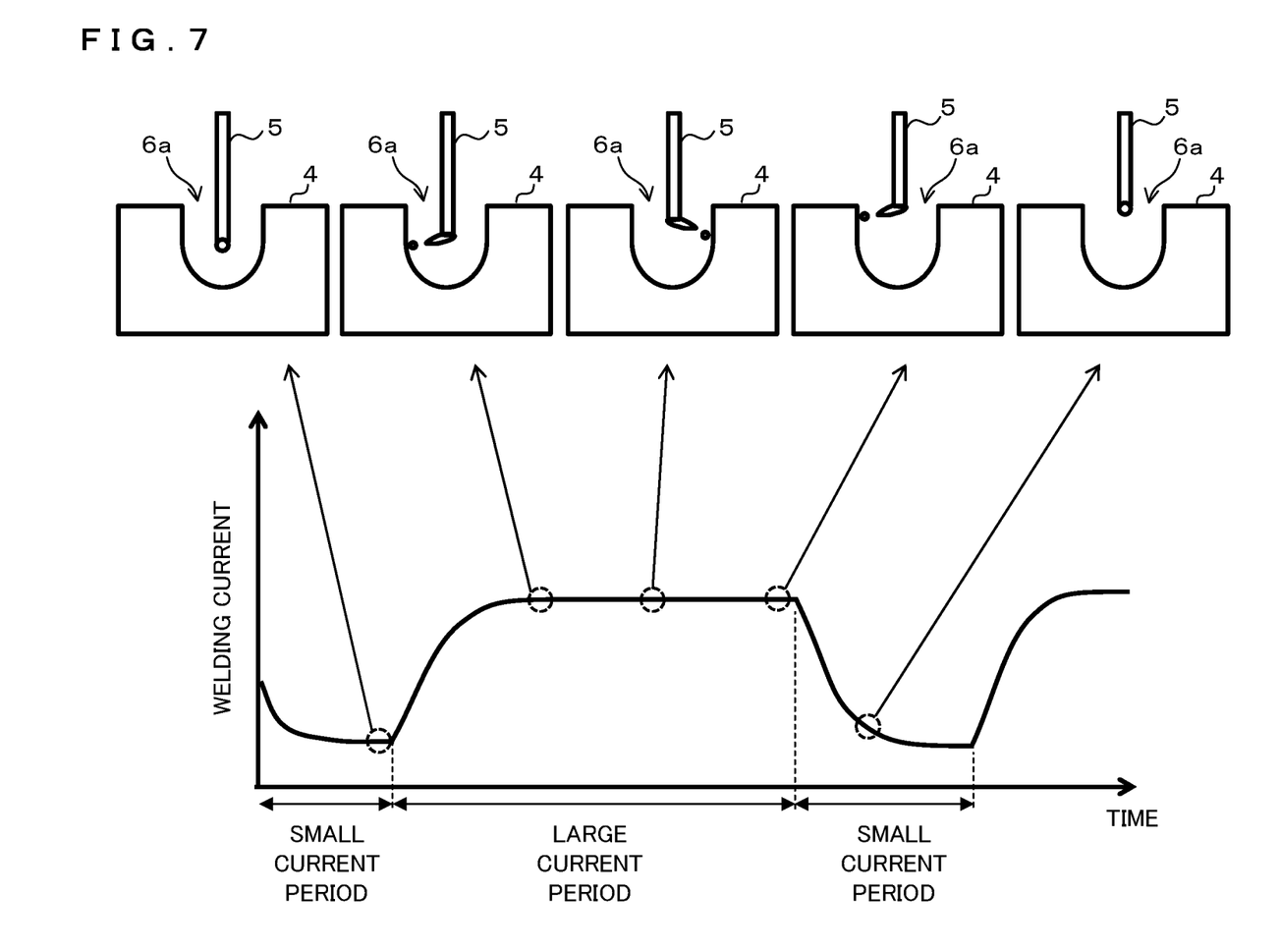
FIG. 7 is a graph illustrating a variation of welding current according to Embodiment 2.

FIG. 7 is a graph illustrating a variation of welding current Iw according to Embodiment 2. The horizontal axis of the graph indicates time, whereas the vertical axis thereof indicates welding current Iw. Moreover, above the graph, a procedure of droplet transfer associated with the change in welding current Iw is schematically illustrated.

In Embodiment 2, the power supply unit 11 performs control such that the large current period is longer than the small current period, and the welding current Iw in the large current period is constant. The length and current value of the large current period are a period and current value in which droplet transfer may be performed multiple times in the large current period. The welding current Iw in the small current period is 200 A, whereas the welding current Iw in the large current period is 500 A, for example.

With the arc welding method and arc welding device according to Embodiment 2 configured as described above, droplet transfer of the welding wire 5 may gradually be performed, which can reduce the length of a liquid column and suppress the occurrence of sputter. Accordingly, in the buried arc welding, the occurrence of sputter may be suppressed while stably maintaining the buried space 6a, allowing for stable single pass penetration welding of a thick plate.

Embodiment 3

As the arc welding method and the arc welding device according to Embodiment 3 are different from those in Embodiment 1 for the method of controlling welding current Iw, the difference will mainly be described below. Since the other configurations and effects are similar to those in Embodiment 1, corresponding parts are denoted by similar reference codes and detailed description thereof will not be repeated.

Figure 8:
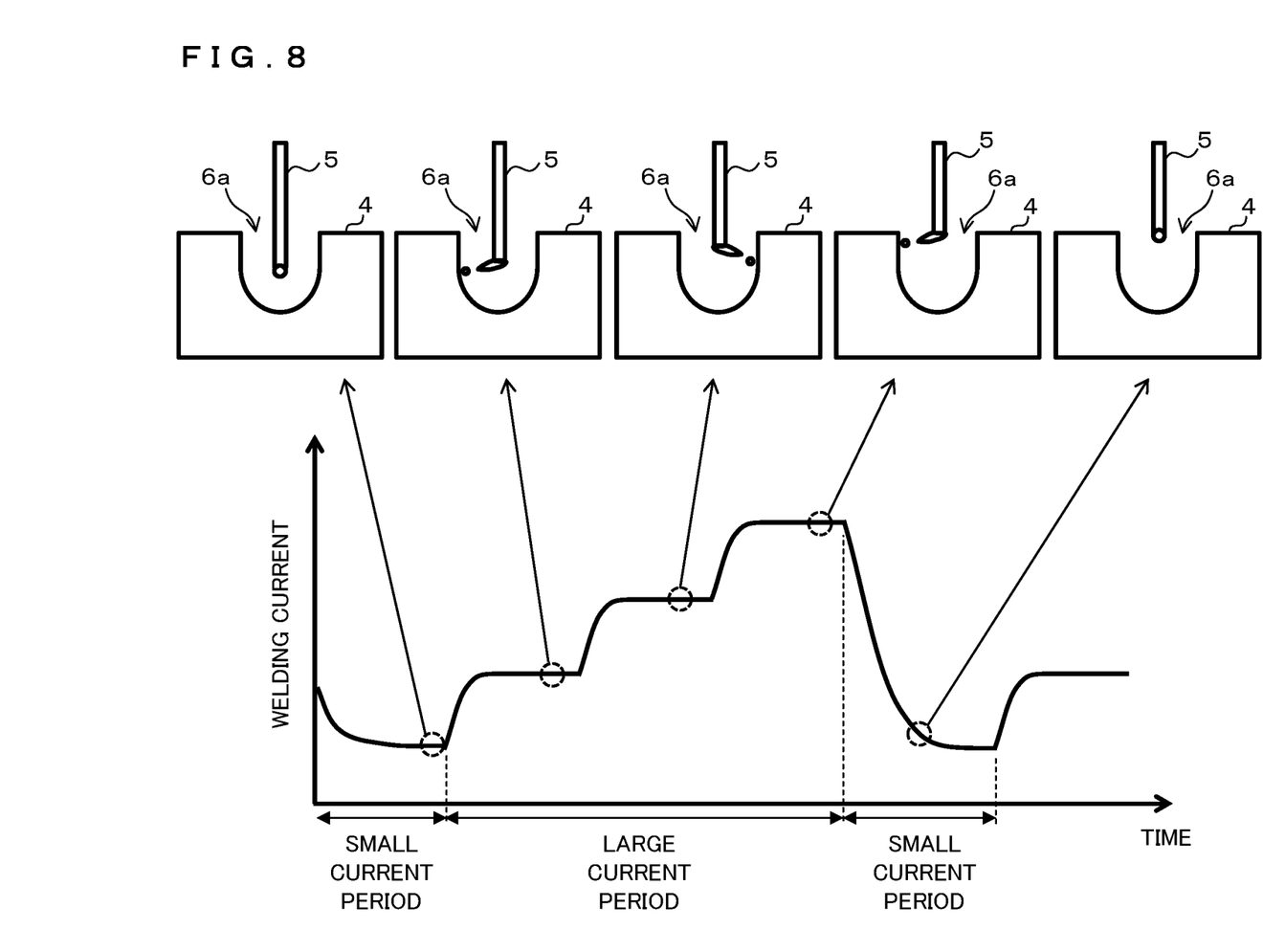
FIG. 8 is a graph illustrating a variation of welding current according to Embodiment 3.

FIG. 8 is a graph illustrating a variation of welding current Iw according to Embodiment 3. The horizontal axis of the graph indicates time, whereas the vertical axis thereof indicates welding current Iw. Moreover, above the graph, a procedure of droplet transfer associated with the change in welding current Iw is schematically illustrated.

In Embodiment 3, the power supply unit 11 controls the output of the welding current Iw so that the welding current Iw is increased step by step in the large current period. For example, the power supply unit 11 increases the welding current Iw in three stages until it reaches the maximum welding current Iw, as illustrated in FIG. 8. The period during which required welding current Iw is output in each stage has substantially the same length as well as substantially the same amount of increase in the welding current Iw.

EXAMPLE

Buried arc welding of the base material 4 is performed under such welding conditions that the welding wire 5 has a diameter of 1.2 mm, the welding power supply 1 has a feeding speed of welding wire 5 at 40 minutes per minute, the average current of welding current Iw of 540 A and the average voltage of 51V.

Figure 9:
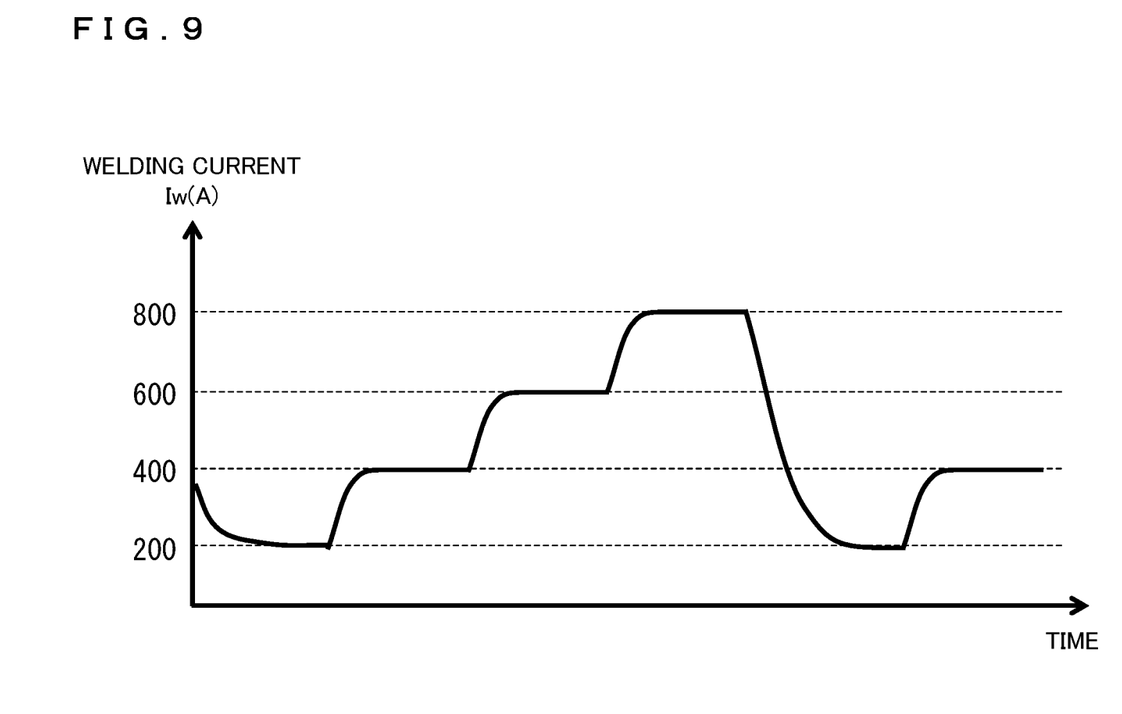
FIG. 9 is a graph illustrating a value of welding current according to an example in Embodiment 3.

FIG. 9 is a graph illustrating the value of the welding current Iw according to an example. The horizontal axis of the graph indicates time, whereas the vertical axis thereof indicates welding current Iw. As illustrated in FIG. 9, the welding power supply 1 supplies the welding current Iw of 200 A during a small current period and supplies the welding current Iw of 400 A, 600 A and 800 A that increases in three stages during a large current period. The frequency in which a unit waveform including the small current period and the large current period is repeated corresponds to 100 Hz. Since droplet transfer occurs once at each of the stages where the welding current Iw is increased during the large current period, the position of the tip of the welding wire 5 may be pulled up while suppressing formation of a long liquid column in the welding wire 5, which thus can stabilize the buried space 6a.

With the arc welding method and arc welding device according to Embodiment 3 configured as described above, in the buried arc welding, the occurrence of sputter may be suppressed while stably maintaining the buried space 6a, allowing for stable single pass penetration welding of a thick plate.

Embodiment 4

As the arc welding method and the arc welding device according to Embodiment 4 are different from Embodiment 1 in the method of controlling welding current Iw, the difference will mainly be described below. Since the other configurations and effects are similar to those in Embodiment 1, corresponding parts are denoted by similar reference codes and detailed description thereof will not be repeated.

Figure 10:
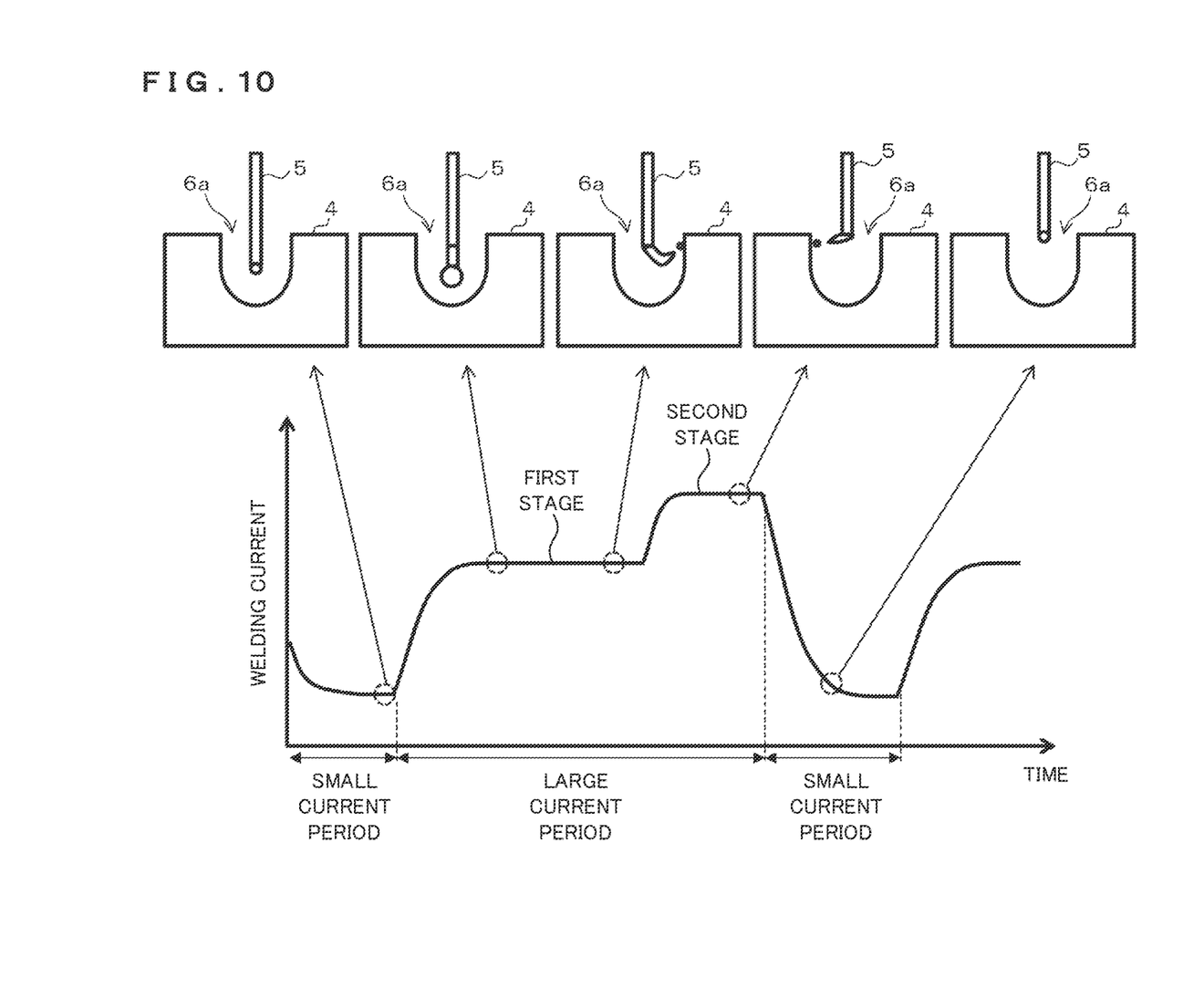
FIG. 10 is a graph illustrating a variation of welding current according to Embodiment 4.

FIG. 10 is a graph illustrating a variation of welding current Iw according to Embodiment 4. The horizontal axis of the graph indicates time, whereas the vertical axis thereof indicates welding current Iw. Moreover, above the graph, a procedure of droplet transfer associated with the change in welding current Iw is schematically illustrated.

In Embodiment 4, the power supply unit 11 controls the output of the welding current Iw so that the welding current Iw is increased step by step in the large current period. For example, the power supply unit 11 increases the welding current Iw in two stages until it reaches the maximum welding current Iw, as illustrated in FIG. 10. The former stage is longer than the latter stage, and the amount of increase in the welding current Iw in the former stage is larger than the amount of increase in the welding current Iw in the latter stage. Specifically, the period of the former stage is approximately twice as long as the latter stage, and the amount of increase in the welding current Iw in the former stage is approximately twice as the amount of the welding current Iw increased from the former stage to the latter stage.

In the state where the tip end 5a of the welding wire 5 is inserted into the buried space 6a deeply or to a middle part, no sputter occurs even if the liquid column is long. The welding wire 5 is thus melted such that, when the tip end 5a of welding wire 5 is pulled up from a lower part to an upper part of the buried space 6a, the welding wire 5 is relatively rapidly melted for droplet transfer in an earlier stage and then increases the welding current Iw to further generate a small amount of droplet transfer, thereby more efficiently pulling up the welding wire 5.

With the arc welding method and arc welding device according to Embodiment 4 configured as described above, in the buried arc welding, the occurrence of sputter may be suppressed while stably maintaining the buried space 6a, allowing for stable single pass penetration welding of a thick plate.

It should be understood that the embodiments disclosed herein are illustrative and non-restrictive in every respect. Since the scope of the present disclosure is defined by the appended claims rather than by the description preceding them, all changes that fall within metes and bounds of the claims, or equivalence of such metes and bounds thereof are therefore intended to be embraced by the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. An arc welding method feeding welding wire to a base material while supplying welding current having an average current of 300 A or larger, comprising:
    feeding the welding wire at a speed of a tip end of the welding wire into a space of a concave melted portion formed in the base material by the arc generated between the tip end and the base material;
    periodically alternating a small current period where a droplet is transferred from the tip end to a bottom part of the melted portion, and a large current period where a droplet is transferred from the tip end to a side part of the melted portion; and
    varying the welding current in the large current period so that a droplet is transferred from the tip end to the side part a plurality of times in each large current period.

2. The arc welding method according to claim 1, wherein a plurality of pulsed currents are supplied in each large current period.

3. The arc welding method according to claim 1, wherein the large current period is longer than the small current period, and the welding current in the large current period is constant.

4. The arc welding method according to claim 1, wherein the welding current is increased step by step in the large current period.

5. The arc welding method according to claim 4, wherein the large current period includes a first stage and a second stage, the welding current in the second stage being larger than the welding current in the first stage, and
    a current difference between the welding current in the first stage and the welding current in the second stage is smaller than a current difference between the welding current in the small current period and the welding current in the first stage.

6. The arc welding method according to claim 1, wherein the large current period and the small current period are alternated at a frequency in a range from 10 Hz to 1000 Hz.

* * * * *